April 8, 1941.   J. D. McGEE   2,237,445
ELECTRON DISCHARGE DEVICE FOR USE IN TELEVISION
Filed Jan. 11, 1938

INVENTOR
JAMES D. McGEE
BY
ATTORNEY

Patented Apr. 8, 1941

2,237,445

UNITED STATES PATENT OFFICE 2,237,445

ELECTRON DISCHARGE DEVICE FOR USE IN TELEVISION

James Dwyer McGee, Ealing, London, England, assignor to Electric & Musical Industries Limited, Hayes, Middlesex, England, a company of Great Britain Application January 11, 1938, Serial No. 184,361
In Great Britain May 13, 1937

2 Claims. (Cl. 250—150)

The present invention relates to electron discharge devices of the kind known as picture multipliers or transformers for use for example in television transmitting systems or other purposes.

In the specification of British Patent No. 442,666 granted February 26, 1936, a cathode ray television transmitting tube is described in which a photo-electron image of an object is focussed onto a mosaic screen which is scanned by a cathode ray to produce picture signals for transmission.

This arrangement constitutes a simple one stage picture multiplier or transformer. Moreover, in the specification of British Patent No. 456,493, granted November 25, 1936, a tube of the above kind is described including several stages of picture multiplication or transformation. This latter specification also describes several other forms of electron discharge devices in which electron images are brought to a focus at required position. For example an electron image may be focussed onto a fluorescent screen.

In the operation of picture multipliers or transformers and other similar devices, in which magnetic focussing devices are used to produce electron images a difficulty arises from the fact that a magnetic focussing device introduces distortion in the electron image formed at its plane or focus. Assuming that the electrons are liberated from a flat, transparent continuous photo-cathode and are then accelerated towards a mosaic or secondary emitting electrode and focussed thereon by a magnetic lens, it will be found that the electron image formed on the mosaic or secondary emitting electrode is rotated bodily through a certain angle (generally between 30° and 60° for a short focussing coil) and is subjected also to internal distortion which is radially symmetrical. For example, referring to Figure 1 of the accompanying drawing, if the cruciform object formed by the crossed lines AB and CD shown is projected onto a photosensitive cathode which emits photo-electrons which are focussed onto a further surface by an electron focussing means, then the focussed image will be found to be of the distorted form indicated by the curved dotted lines A'B' and C'D', the electron image of the object having been rotated in the case illustrated, through approximately 45° in a clockwise direction with respect to the object, and at the same time the spiral distortion of the extremities of the radial lines amounts to from 10-20°.

Figure 1:
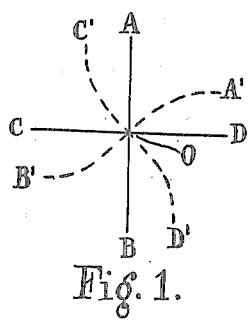

The object of the present invention is to provide a picture multiplying or transforming arrangement in which distortion of the kind illustrated in Figure 1, is either corrected or minimized in the finally produced electron image.

According to the present invention, a picture multiplying or transforming arrangement is provided having at least two stages in each of which electron images are produced and each including a magnetic lens or lens system the arrangement being such that the rotational and spiral distortion in the electron image produced in at least one stage is opposite that produced in at least one other stage whereby the rotational and spiral distortion produced in the final electron image may be wholly or partly compensated.

Preferably a picture multiplying or transforming arrangement according to the invention is made up of one or more pairs of stages each including a magnetic lens or lens system, the lens or lens system in one stage in the one or each pair of stages producing a real electron image on a surface from which electrons are emitted in accordance with the local distribution of electrons over the surface, the lens or lens system in the other stage of each pair forming an image by focussing the electrons emitted from said surface and being so energized that it produces an amount of rotational and spiral distortion substantially equal in magnitude and opposite in sense to that produced by the lens or lens system in the first stage. If desired, in two successive stages, the electron image formed by the magnetic lens or lens system of one stage may be formed on a surface arranged at an oblique angle to the axis of the lens, electrons being emitted from said surface in accordance with the electron image formed thereon and from the side on which said image is projected, the emitted electrons being focussed by the magnetic lens or lens system of the succeeding stage which is arranged to produce rotational and spiral distortion opposite to that produced in the preceding stage.

Figure 2:
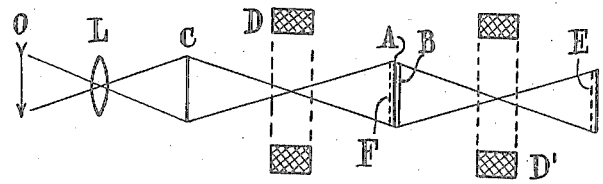

The nature of the invention of the method of carrying the same into effect will be fully understood from the following description in detail reference being made to Figure 2 of the accompanying drawing which shows diagrammatically an embodiment of the invention.

In Figure 2 it will be seen that an optical image of an object O is projected onto a plane transparent photosensitive cathode C by a lens L and the photo-electrons liberated from the cathode C are focussed by the field produced by electric current flowing in a coil D on a fluorescent screen F. The image formed on this screen will be rotated and distorted as described with reference to Figure 1. The light from the fluorescent image on screen F passes through a transparent supporting plate A (which may be for example formed of a mica) and liberates photo-electrons from another continuous photo-sensitive cathode B, located on or against the plate A, these electrons being then accelerated towards, and focussed upon a sensitive mosaic screen E by the field set up due to current flowing through the coil D'.

Now if according to the invention, the circuit in the coil D' is in the reverse direction to that in the coil D, the spiral and rotational distortion produced in the electron image formed on screen E will be in the opposite direction to that introduced in the first image produced under the action of coil D.

Thus, if the dimensions of the focussing stages are the same, and the magnification equal, the spiral and rotational distortions produced will be equal and opposite. Hence, the electron image formed on screen E, which may be the mosaic of a cathode ray television transmitting tube, will be substantially unrotated and free from spiral distortion with reference to the object O.

If desired, the coils such as D and D' might be replaced by other electron lens field producing arrangements. For example, permanent magnet arrangements as described in co-pending patent application No. 29,818 filed November 1, 1937 (in the name of F. H. Nicoll), might be used.

The invention is not restricted in its application to an arrangement such as shown in Figure 2, since it may for example be applied to any of the arrangements such as are described in British patent specification 456,493, including the case in which the beam of primary electrons impinges on a surface of an angle to the direction of the beam of secondary or photo-electrons liberated from said surface.

It will be further appreciated that an arrangement according to the invention may comprise more than two electron emission and focussing stages and if the stages are generally similar, substantially complete correction of distortion will be obtained when an even number of stages which can be arranged in pairs for compensating purposes is used, whilst when an odd number of stages is used it is possible when applying the invention to reduce the total distortion to substantially the distortion arising from one stage only.

I claim:

1. An optical image transforming apparatus comprising means for transforming an optical image into an electron image, a first magnetic means for focusing said electron image onto a focal plane, said magnetic focusing means producing a rotative distortion in said electron image, means positioned at said focal plane for converting the electron image into an optical image, means positioned adjacent said latter means for converting the latter formed optical image into an electron image and a plurality of additional magnetic focusing means each adapted to focus an electron image onto a definite focal plane, all of said additional magnetic focusing means having an aggregate rotative distortion characteristic substantially equal to that of the first mentioned magnetic focusing means and opposite in direction thereto.

2. An optical image transforming apparatus comprising means for transforming an optical image into an electron image, a first magnetic means for focusing said electron image onto a focal plane, said magnetic focusing means producing a rotative distortion in said electron image, means positioned at said focal plane for converting the electron image into an optical image, means positioned adjacent said latter means for converting the latter formed optical image into an electron image and an additional magnetic focusing means adapted to focus an electron image onto a definite focal plane, said additional magnetic focusing means having a rotative distortion characteristic substantially equal to that of the first mentioned magnetic focusing means and opposite in direction thereto.

JAMES DWYER McGEE.